United States Patent
Ong et al.

(10) Patent No.: US 12,345,578 B2
(45) Date of Patent: Jul. 1, 2025

(54) TEMPERATURE COMPENSATION FOR STRAIN SENSOR

(71) Applicant: Microsoft Technology Licensing, LLC, Redmond, WA (US)

(72) Inventors: Xiao Chuan Ong, Bellevue, WA (US); Wyatt Owen Davis, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 523 days.

(21) Appl. No.: 17/747,898

(22) Filed: May 18, 2022

(65) Prior Publication Data

US 2023/0400366 A1    Dec. 14, 2023

(51) Int. Cl.
    *G01L 1/18*     (2006.01)
    *G01L 1/22*     (2006.01)
    *G02B 26/08*    (2006.01)

(52) U.S. Cl.
    CPC ............. *G01L 1/18* (2013.01); *G01L 1/2281* (2013.01); *G02B 26/0833* (2013.01)

(58) Field of Classification Search
    CPC ................................ G01L 1/18; G01L 1/2281
    See application file for complete search history.

(56) References Cited

U.S. PATENT DOCUMENTS

| | | | | |
|---|---|---|---|---|
| 3,444,499 A * | 5/1969 | Lovelace | ................... | G01L 1/18 257/417 |
| 4,337,665 A * | 7/1982 | Sato | ........................ | G01L 9/065 73/766 |
| 5,048,343 A * | 9/1991 | Oboodi | ................. | G01L 1/2281 73/862.623 |
| 5,460,050 A * | 10/1995 | Miyano | ................. | G01L 1/2281 73/766 |
| 6,011,422 A * | 1/2000 | Koglin | ................ | H03F 3/45098 327/563 |
| 7,430,920 B2 * | 10/2008 | Sumigawa | ............... | G01B 7/20 73/777 |
| 2007/0018655 A1 * | 1/2007 | Ausserlechner | ....... | H10N 52/80 324/501 |
| 2016/0245668 A1 * | 8/2016 | Ausserlechner | ..... | G01D 3/0365 |
| 2020/0004011 A1 * | 1/2020 | Champion | ........... | G02B 26/105 |
| 2021/0364375 A1 * | 11/2021 | Zamprogno | ............. | G01D 5/16 |

FOREIGN PATENT DOCUMENTS

| | | | |
|---|---|---|---|
| CN | 212253981 U | * | 12/2020 |
| EP | 0631121 A2 | | 12/1994 |

OTHER PUBLICATIONS

"International Search Report and Written Opinion Issued in PCT Application No. PCT/US23/013457", Mailed Date: Jun. 16, 2023, 11 Pages.

* cited by examiner

*Primary Examiner* — Helen C Kwok
(74) *Attorney, Agent, or Firm* — Workman Nydegger

(57) ABSTRACT

A strain sensor that has an associated temperature compensation circuit. The strain sensor is temperature-compensated as it has a temperature compensation circuit that, when powered, applies an applied voltage across the applied voltage terminals of the strain sensor that has a compensating temperature dependency. That is, the applied voltage has a temperature dependency of one polarity that is opposite a temperature dependency of the strain sensor. Because of this temperature compensation, the signal representing strain has a more stable scale factor between the endured strain and the signal representing the strain. Thus, the accuracy of the strain sensor is improved.

20 Claims, 6 Drawing Sheets

TEMPERATURE COMPENSATION FOR STRAIN SENSOR

BACKGROUND

A strain sensor generates a signal from which strain can be determined. As an example, a typical strain sensor may be composed of four piezoresistive elements composed as a Wheatstone bridge, where the four elements are placed as each of four sides of a square shape. When the four piezoresistive elements are positioned as sides of a square, the nodes there between may be considered as corners of the square.

When a voltage is applied across opposite nodes (e.g., opposite corners) of the square bridge, the other opposite nodes (e.g., the other opposite corners of the bridge) will generate a voltage difference that approximately linearly represents the strain endured by the strain sensor. Thus, the bridge can be said to have a scale factor between the strain endured by the bridge and the signal output from the bridge.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to a strain sensor that has an associated temperature compensation circuit. The strain sensor has applied voltage terminals, and strain measurement terminals. A voltage is applied across the applied voltage terminals in order to power the strain sensor. Strain may be measured based on a signal present across the strain measurement terminals. That signal depends on the strain being endured by the strain sensor. However, the strain sensor would, absent a temperature compensation circuit, have a temperature dependency. In other words, the scale factor between the endured strain and the signal level will differ depending on the temperature.

However, the strain sensor is temperature-compensated as it has a temperature compensation circuit that, when powered, applies an applied voltage across the applied voltage terminals of the strain sensor. That applied voltage has a compensating temperature dependency. That is, the applied voltage has a temperature dependency of one polarity that is opposite a temperature dependency of the strain sensor. Because of this temperature compensation, the signal representing strain has a more stable scale factor between the endured strain and the output signal representing the strain. Thus, the accuracy of the strain sensor is improved even with fluctuations of temperature.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to a strain sensor that has an associated temperature compensation circuit. The strain sensor has applied voltage terminals, and strain measurement terminals. A voltage is applied across the applied voltage terminals in order to power the strain sensor. Strain may be measured based on a signal present across the strain measurement terminals. That signal depends on the strain being endured by the strain sensor. However, the strain sensor would, absent a temperature compensation circuit, have a temperature dependency. In other words, the scale factor between the endured strain and the signal level will differ depending on the temperature.

However, the strain sensor is temperature-compensated as it has a temperature compensation circuit that, when powered, applies an applied voltage across the applied voltage terminals of the strain sensor. That applied voltage has a compensating temperature dependency. That is, the applied voltage has a temperature dependency of one polarity that is opposite a temperature dependency of the strain sensor. Because of this temperature compensation, the signal representing strain has a more stable scale factor between the endured strain and the output signal representing the strain. Thus, the accuracy of the strain sensor is improved even with fluctuations of temperature.

Figure 1:
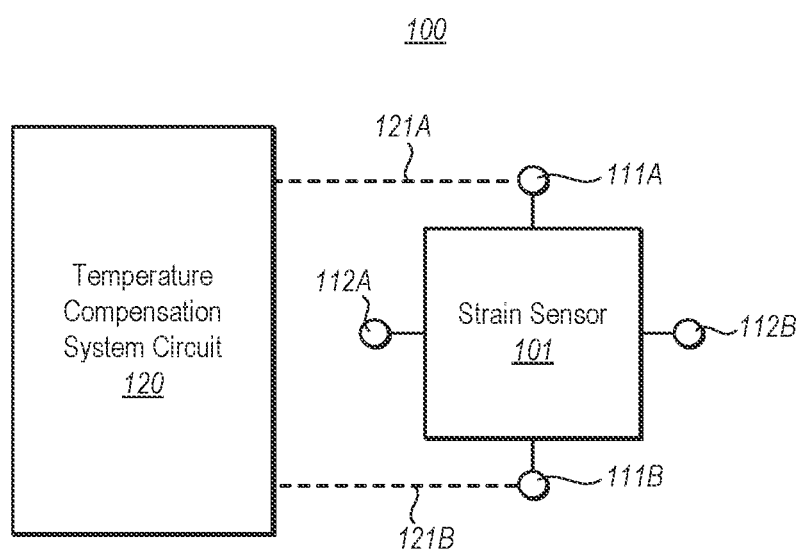
FIG. 1 illustrates a circuit that includes a strain sensor and a temperature compensation circuit, in accordance with the principles described herein.

FIG. 1 illustrates a circuit 100 that includes a strain sensor 101 and a temperature compensation circuit 102, in accordance with the principles described herein. The strain sensor 101 includes applied voltage terminals 111A and 111B and strain measurement terminals 112A and 112B. When a voltage is applied across the applied voltage terminals 111A and 111B, the strain sensor 101 generates a signal across the strain measurement terminals 112A and 112B that depends on a strain induced by the strain sensor.

The signal may, for example, take the form of a voltage, though that is not required. The principles described herein are also applicable if the output signal is a current or power signal as well. Furthermore, although the strain sensor 101 is illustrated as outputting a differential signal across the strain measurement terminals 112A and 112B, the principles described herein are not limited to an embodiment in which the strain sensor 101 generates differential output. Rather, the principles described herein may also be applied if the strain sensor 101 had but a single output terminal (e.g., the terminal 112A only) on which the signal is applied. However, because differential output can have greater sensitivity to strain, the strain sensor 101 is illustrated as having two strain measurement terminals 112A and 112B.

The temperature compensation circuit 102, when powered, applies an applied voltage across the applied voltage terminals 111A and 111B of the strain sensor 101. This is symbolically represented by dashed lines 121A and 121B. However, the dashed lines 121A and 121B do not imply that the temperature compensation circuit 102 directly applies the applied voltage across the respective applied voltage terminals 111A and 111B. Such applied voltage may be indirectly applied by inducing the applied voltage. As an example, the applied voltage may be induced across the applied voltage terminals 111A and 111B by forcing a current to pass from the applied voltage terminal 111A through the strain sensor 101 and to the applied voltage terminal 111B. The two example temperature-compensated strain sensors of FIGS. 4 and 5 do in fact cause the applied voltage to be induced by forcing a current through the strain sensor.

The strain senser 101 generates a signal across the strain measurement terminals 112A and 112B that has a temperature dependency. Thus, a given strain will cause one output signal level at one temperature, while the exact same strain will cause another output signal level at another temperature. This is because the strain sensor 101 has a scale factor between strain as input and signal level as output, and that scale factor itself may change with temperature.

Now there will be herein a brief note about nomenclature. Broadly speaking, a "scale factor" of a circuit element is defined herein as a ratio between the output of the circuit element and the input of the circuit element. In this description and in the claims, a circuit element which has a scale factor that declines with temperature will be referred to as having a "negative temperature dependency", and a circuit element which has a scale factor that increases with temperature will be referred to as having a "positive temperature dependency". Furthermore, a positive temperature dependency will sometimes be referred to as a temperature dependency that has a "polarity" or a "positive polarity", and a negative temperature dependency will sometimes be referred to as having a temperature dependency of another polarity or a "negative polarity". Lastly, a temperature dependency that has a positive polarity is said to have an "opposite" polarity as a temperature dependency that has a negative polarity.

As already mentioned, the strain sensor 101 generates a signal across the strain measurement terminals 112A and 112B that is approximately proportional to the strain experienced by the strain sensor 101. However, the signal is also approximately proportional to the applied voltage applied between the applied voltage terminals 111A and 111B. Thus, the output signal of the strain sensor 101 is approximately proportional to the multiplicative product of the endured strain and applied voltage. The applied voltage is conventionally relatively constant. However, the principles described herein reduces the temperature dependency of the strain sensor by applying an applied voltage that has an opposite temperature dependency, with the aim of reducing or even cancelling the temperature dependence in the output signal.

Accordingly, the temperature compensation circuit applies the applied voltage such that the applied voltage has a temperature dependency of one polarity that is opposite the temperature dependency of the strain sensor. That is, if the strain sensor 101 is of the variety that has a positive temperature dependency, the temperature compensation circuit 102 is chosen to be structured to apply an applied voltage with a negative temperature dependency to at least partially offset the positive temperature dependency of the strain sensor 101. Thus, in this case, had the applied voltage been constant, the strain sensor 101 would indeed have a scale factor that increases with temperature. However, because the temperature compensation circuit 102 applies an applied voltage that has a negative temperature dependency, the strain sensor 101 ends up generating a signal that has much less dependence on temperature.

On the other hand, if the strain sensor 101 is of the variety that has a negative temperature dependency, the temperature compensation circuit 102 is chosen to be structured to apply an applied voltage with a positive temperature dependency to at least partially offset the negative temperature dependency of the strain sensor 101. Thus, in this case, had the applied voltage been constant, the strain sensor 101 would indeed have a scale factor that decreases with temperature. However, because the temperature compensation circuit 102 applies an applied voltage that has a positive temperature dependency, the strain sensor 101 ends up generating a signal that has much reduced temperature dependency. While the principles described herein apply either way, in the example circuits below, the strain sensor has a negative temperature dependency, and the voltage applied by the temperature compensation circuit has a positive temperature dependency.

If the temperature compensation circuit 102 produces an applied voltage that offsets 100 percent of the temperature dependency of the strain sensor 101 at all times, then the strain signal provided by the strain sensor 101 will have no temperature dependency at all. Thus, in that case, the temperature-compensated strain sensor 100 will perfectly cancel out any temperature effects. However, in practicality, it is impossible to offset exactly 100 percent of the temperature dependence of the strain sensor.

Nevertheless, suppose the temperature compensation circuit 102 applies an applied voltage that has a temperature dependency that offsets from 50 to 150 percent of the temperature dependency of the strain sensor for at least a majority of temperatures between minus 20 degrees Celsius and positive 60 degrees Celsius. In that case, for those devices that have this as an operational temperature range, the temperature dependency of the temperature-compensated strain sensor will be at least halved or more compared to an uncompensated strain sensor for most temperatures within the operating range. If it does so for all temperatures within that range, then the temperature dependency of the temperature-compensated strain sensor will be at least halved for all temperatures within the operating range.

Suppose that instead the temperature compensation circuit 102 applies an applied voltage with temperature dependency that offsets from 75 to 125 percent of the temperature dependency of the strain sensor for at least a majority of temperatures between minus 20 degrees Celsius and positive 60 degrees Celsius. In that case, the temperature dependency of the temperature-compensated strain sensor will be cut by at least three-fourths or more compared to an uncompensated strain sensor for most temperatures within the operating range. If it does so for all temperatures within that range, then temperature dependency of the temperature-compensated strain sensor will be cut by at least three-fourths for all temperatures within the operating range.

Suppose that instead the temperature compensation circuit 102 applies an applied voltage with temperature dependency that offsets from 90 to 110 percent of the temperature dependency of the strain sensor for at least a majority of temperatures between minus 20 degrees Celsius and positive 60 degrees Celsius. In that case, the temperature dependency of the temperature-compensated strain sensor will be cut by at least 90 percent or more compared to an uncompensated strain sensor for most temperatures within the operating range. If it does so for all temperatures within that range, then temperature dependency of the temperature-compensated strain sensor will be cut by at least 90 percent (i.e., by at least an order of magnitude) for all temperatures within the operating range.

Figure 2:
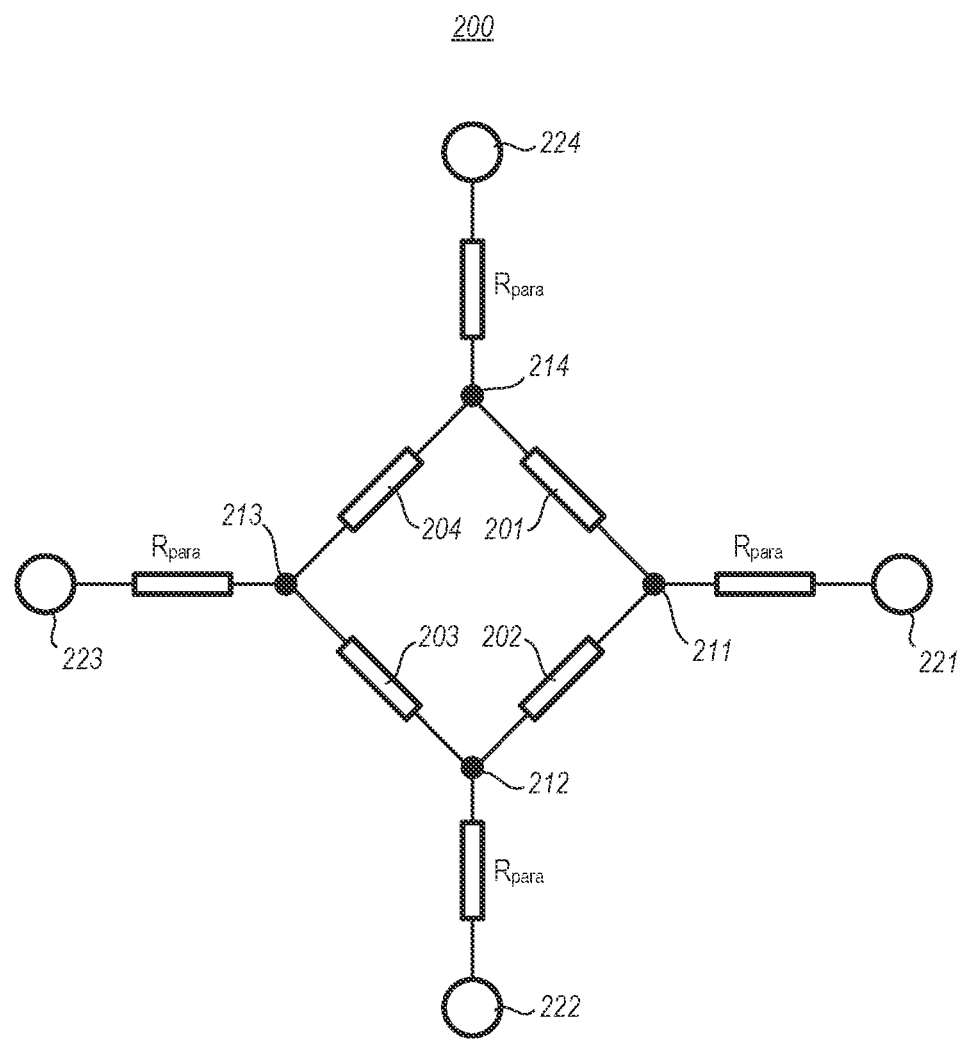
FIG. 2 illustrates an example of a strain sensor, that represents one example of the strain sensor of FIG. 1, and which includes four piezoresistive elements configured as a Wheatstone bridge.

FIG. 2 illustrates an example of a strain sensor 200, that represents one example of the strain sensor 101 of FIG. 1. The strain sensor 200 comprises four piezoresistive elements 201, 202, 203 and 204 configured as a Wheatstone bridge thereby forming node 211 between piezoresistive elements 201 and 202, node 212 between piezoresistive elements 202 and 203, node 213 between piezoresistive elements 203 and 204, and node 214 between piezoresistive elements 204 and 201.

In addition, the bridge may structurally be formed in a square shape in which the piezoresistive elements 201 through 204 are each positioned at a side of the square, and where each node is positioned at a corner of the square. The piezoresistive elements 201 through 204 have approximately the same resistance when there is no strain in the strain sensor 200. Parasitic resistances $R_{para}$ are also shown though they are not intentional circuit elements, but merely properties of conductors.

In this configuration, the opposite nodes 214 and 212 are applied voltage terminals 224 and 222, respectively, with some parasitic resistance. Furthermore, the nodes 213 and 211 are the strain measurement terminals 223 and 221, respectively, with some parasitic resistance. Thus, when the strain sensor 200 is an example of the strain sensor 101 of FIG. 1, the terminal 224 is an example of the applied voltage terminal 111A of FIG. 1, the terminal 222 is an example of the applied voltage terminal 111B of FIG. 1, the terminal 223 is an example of the strain measurement terminal 112A of FIG. 1, and the terminal 221 is an example of the strain measurement terminal 112B of FIG. 1.

The use of piezoresistive elements is advantageous in a strain sensor because the elements respond quickly to change resistances in response to strain. Thus, strain sensors that operate on the principle of resistance changes in response to strain can provide rapid real-time measurements of current strain. This is thus particularly advantageous where strain changes quickly, and is relied upon to make rapid adjustments. Such may be the case where the strain sensor is used to measure angular position of a micromirror that vibrates many times and perhaps thousands of times per second.

Additionally, the change in resistance is approximately linearly proportional to the strain experienced by the piezoresistive element. Thus, the strain can be quickly determined based on changes in resistance. Furthermore, the configuration of the piezoresistive elements as a Wheatstone bridge allows for improved sensitivity in the output signal, in that even slight changes in resistance of a piezoresistive element is easily detected at the strain measurement terminals. Furthermore, the Wheatstone structure allows the linearity of the strain to remain in the linearity of the output signal of the Wheatstone bridge. This is particularly true where the Wheatstone bridge is laid out as a square with each piezoresistive element positioned at a side of the square.

Figure 3:
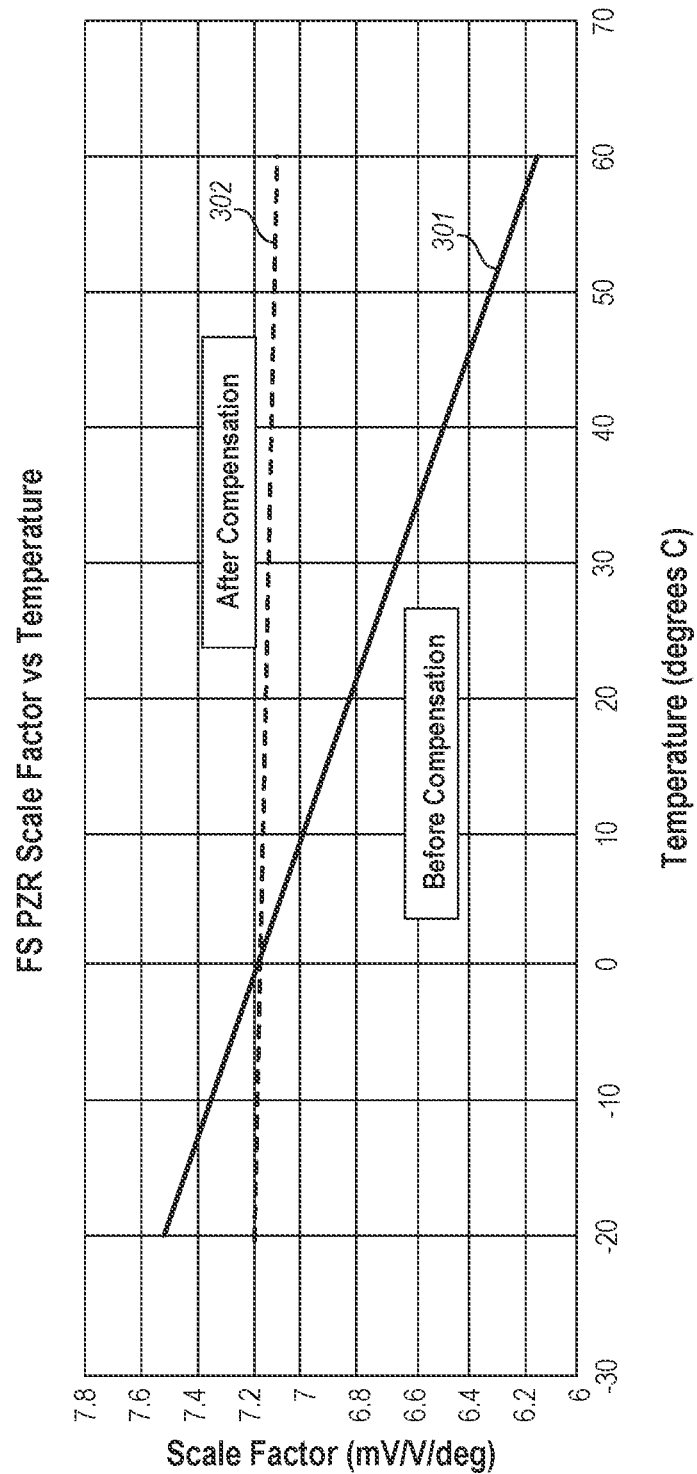
FIG. 3 illustrates an example of the relationship between scale factor and temperature of a strain sensor both before temperature compensation and after temperature compensation.

FIG. 3 illustrates an example of the relationship between scale factor and temperature for a particular strain sensor such as that of FIG. 2. The horizontal axis represents temperature, and scale factors are shown between minus 20 degrees Celsius and positive 60 degrees Celsius. This may be a suitable range of operating temperatures where the strain sensor is incorporated into a wearable device. The vertical axis represents the scale factor of the output signal over the strain. The output signal is in mV/V, that is the number of millivolts (in millivolts) hat is measured given the applied voltage (in volts). The strain is measured in degrees (e.g., degrees of a micromirror assembly described further below). The solid line 301 represents the scale factor of a strain sensor (such as that of FIG. 2) prior to temperature compensation, or in other words, given a constant applied voltage. The dashed line 302 represents that scale factor of the same strain sensor in which the applied voltage compensates for the temperature dependence of the strain sensor itself. Note that the dependence of temperature has been reduced by at least a factor of 10.

The strain sensor of FIG. 2 has a negative temperature dependency in which the scale factor declines approximately linearly with temperature (assuming the applied voltage is constant). The piezoresistive elements have a negative temperature dependency as individual elements, and that negative temperature dependency carries forward into the output signal of the strain sensor. In this situation, the temperature compensation circuit should provide a positive temperature dependency in the applied voltage that is applied at the applied voltage terminals of the strain sensor. Thus, a temperature compensation circuit that provides an applied voltage with a positive temperature dependency has the capability to offset temperature dependency in the strain signal produced by a strain sensor that operates on piezoresistive elements.

Figure 4:
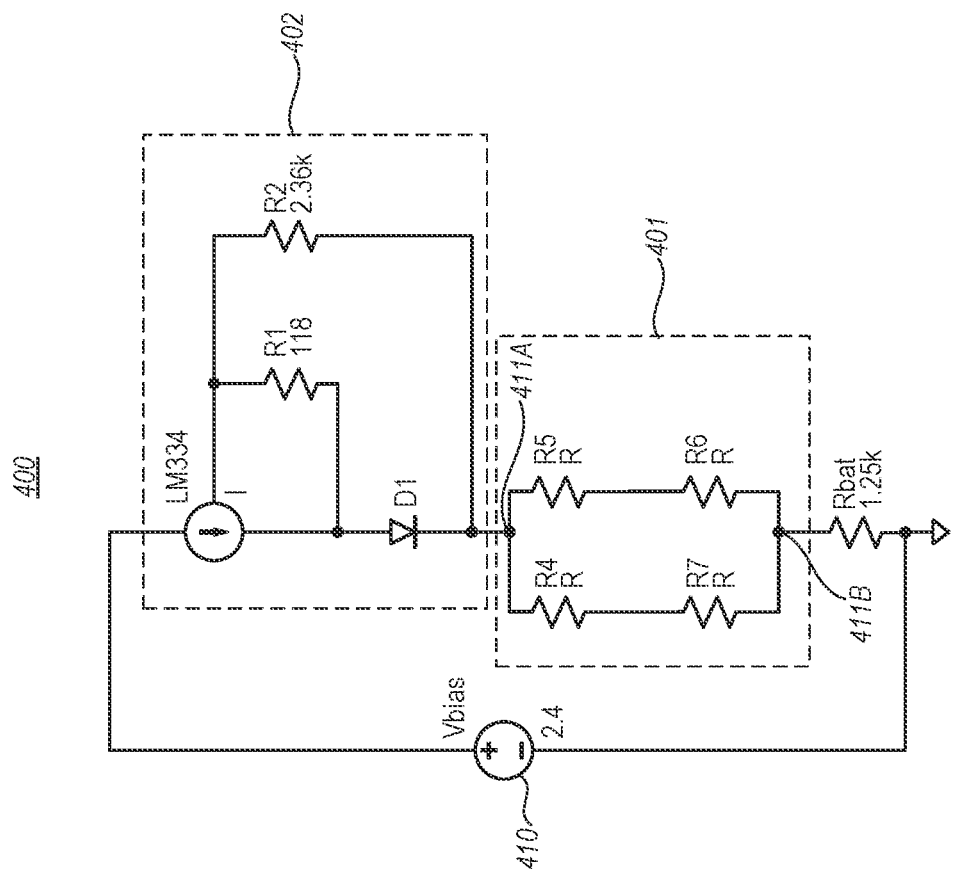
FIG. 4 illustrates one embodiment of a temperature-compensated strain sensor that represents one example of the temperature-compensated strain sensor of FIG. 1, and in which the temperature compensation circuit is in series between the voltage supplies.

FIG. 4 illustrates one embodiment of a temperature-compensated strain sensor 400 that represents one example of the temperature-compensated strain sensor 100 of FIG. 1. The circuit 400 includes a strain sensor 401 and a temperature compensation circuit 402. In this configuration, the temperature compensation circuit 402 is coupled in series with the strain sensor 401 between a positive voltage supply (i.e., the positive terminal of a voltage supply 410) and a negative voltage supply (e.g., the negative terminal of the voltage supply 410).

The strain sensor 401 may be structured as described above for the strain sensor 200 of FIG. 2. The four resistors R4, R5, R6 and R7 have approximately equal resistance R when the strain sensor is not subject to strain, but change resistances when subject to strain. The four resistors R4, R5, R6 and R7 are examples of the piezoresistive elements 204, 201, 202 and 203, respectively, of FIG. 2. The nodes 411A and 411B are examples of the respective applied terminals 224 and 222 of FIG. 2. The strain measurement terminals are not shown in FIG. 4, but there would be one between resistors R4 and R7, and another between resistors R5 and R6.

The temperature compensation circuit 402 operates to supply an applied voltage that is a function of temperature. Recall in this example that the strain sensor 401 has a negative temperature dependency given a constant voltage across the applied voltage terminals 411A and 411B. For instance, if the applied voltage across the terminals 411A and 411B is constant, the strain sensor 401 may have the negative temperature dependency shown as the solid line 301 of FIG. 3. However, the temperature compensation circuit 402 operates to supply an applied voltage that has a scale factor that positively varies approximately linearly with temperature. In such a case, the actual scale factor of the temperature-compensated strain sensor 400 becomes much more constant with temperature, as represented by the dashed line 302 of FIG. 2.

In order to provide the applied voltage with positive temperature dependency, the temperature compensation circuit uses a current source LM334 that has a positive temperature dependency. This current source may be the LM334 current source produced by Texas Instruments. The diode D1, on the other hand, provides a negative temperature dependency. The resistances R1 and R2 may be tuned to determine how much of the current from the current source LM334 passes through the diode D1, and how much current from the current source LM334 is diverted around the diode D1. Accordingly, by adjusting the resistances R1 and R2, the amount of negative temperature dependency provided by the diode D1 to the output current on node 411A can be adjusted.

In this case, the temperature compensation circuit 402 thus has a first component (e.g., current source LM334) that has a fixed temperature dependency, and a second component (e.g., the combination of elements D1, R1 and R2) that has an adjustable temperature dependency. The first component provides a rough compensation that gets the compensative temperature dependency close to right, whilst the adjustable components are used to fine tune the temperature dependency. The use of such a fixed temperature dependency first component and an adjustable temperature dependency second component allows for the temperature compensation to both be significant in magnitude and tunable in sensitivity.

Thus, the negative temperature dependency provided by the diode D1 and the resistors R1 and R2 can be adjusted to reduce the positive temperature dependency in the output current on node 411A to below the positive temperature dependency in the current provided by the current source LM334. Thus, the temperature compensation circuit 402 can provide a current with a tuned positive temperature dependency, which induces a corresponding voltage across applied voltage terminals 411A and 411B that also has a tuned positive temperature dependency. The positive temperature dependency of that applied voltage is tuned to approximately match the negative temperature dependency of what the strain sensor 401 would otherwise provide if subjected to a constant applied voltage. The embodiment of FIG. 4 makes for a compact design that can use off-the-shelf current sources.

Figure 5:
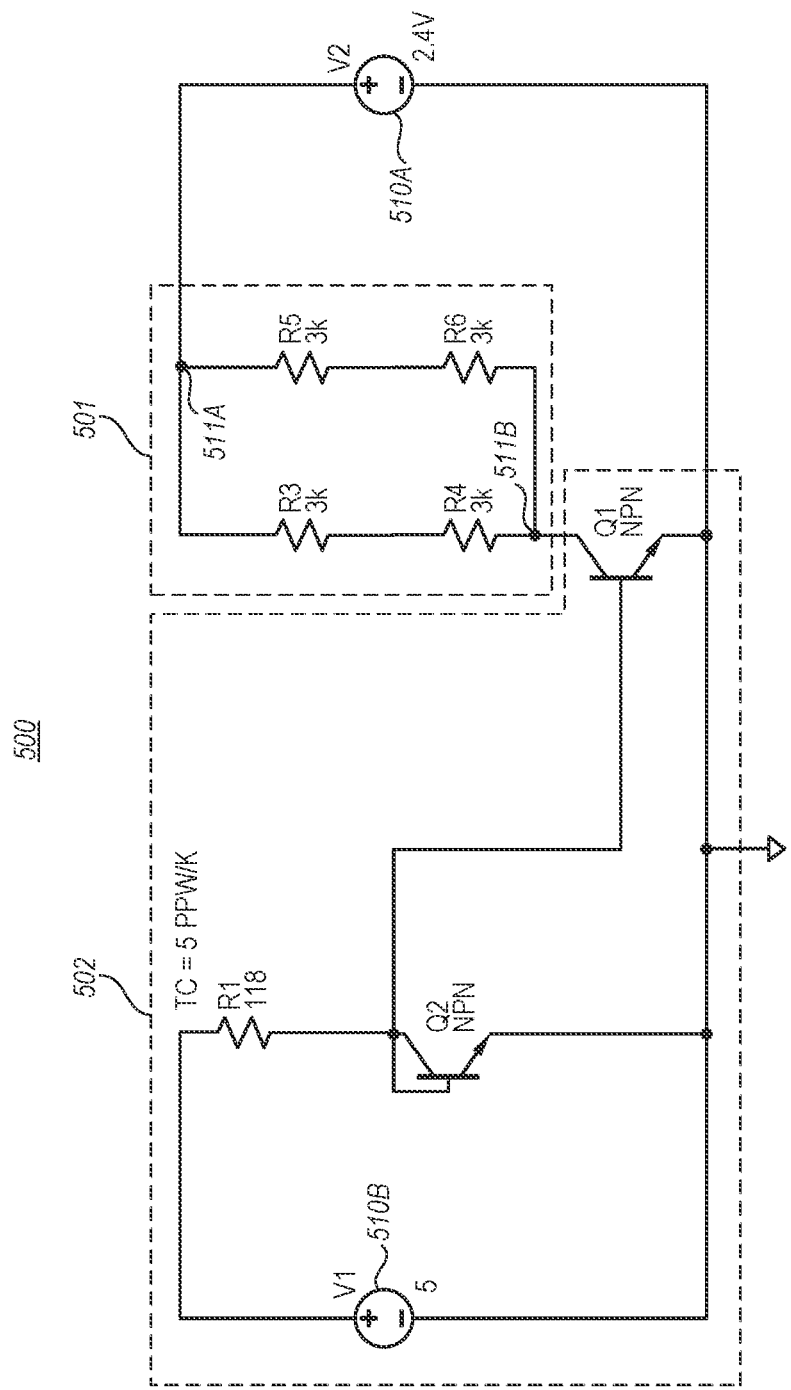
FIG. 5 illustrates another embodiment of a temperature-compensated strain sensor that represents another example of the temperature-compensated strain sensor of FIG. 1, and in which the temperature compensation circuit is primarily in parallel between voltage supplies, but the applied current is mirrored to pass through the strain sensor.

FIG. 5 illustrates another embodiment of a temperature-compensated strain sensor 500 that represents another example of the temperature-compensated strain sensor 100 of FIG. 1. The circuit 500 includes a strain sensor 501 and a temperature compensation circuit 502. In this configuration, the temperature compensation circuit 502 is coupled in parallel with the strain sensor 501 between a positive voltage supply (i.e., the positive terminal of a voltage supply 510 for the strain sensor 501, and the positive terminal of a voltage supply 510B for the temperature compensation circuit 502) and a negative voltage supply (e.g., ground).

The strain sensor 501 may again be structured as described above for the strain sensor 200 of FIG. 2. The four resistors R3, R4, R5 and R6 have approximately equal resistance when the strain sensor is not subject to strain, but change resistances when subject to strain. The four resistors R3, R4, R5 and R6 are examples of the piezoresistive elements 204, 203, 201 and 202, respectively, of FIG. 2. The nodes 511A and 511B are examples of the respective applied terminals 224 and 222 of FIG. 2. The strain measurement terminals are not shown in FIG. 5, but there would be one between resistors R3 and R4, and another between resistors R5 and R6.

Here, an applied voltage is generated by passing a constant voltage through a resistor R1 and a bi-polar transistor Q2. The resistor R1 provides a positive temperature dependency that is adjustable (by adjusting the resistance), and the bi-polar transistor Q2 provides a negative temperature coefficient. The bi-polar transistors Q1 and Q2 share their base terminals, which is connected with the collector terminal of bi-polar transistor Q2. This causes the same current that passes through (from the collector to the emitter terminals) the bi-polar transistor Q2 to be mirrored through from the collector to the emitter terminals) the bi-polar transistor Q1. Thus, the applied current with the positive temperature dependency is drawn from the terminal 511B, thereby inducing an applied voltage across terminals 511A and 511B that has a positive temperature dependency that offsets much of the negative temperature dependency of the strain sensor 501. The circuit of FIG. 5 has the advantage in that it may operate with a lower supply voltage, since the only voltage overhead over and above the voltage drop across the strain sensor itself is via a current-mirrored transistor.

Figure 6:
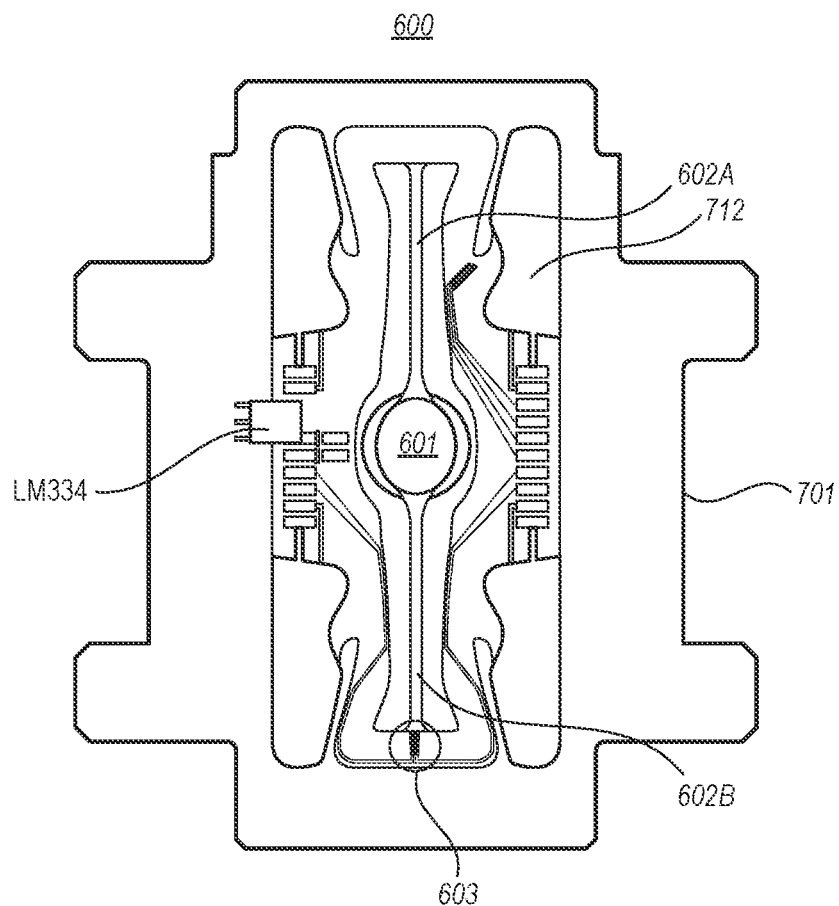
FIG. 6 illustrates a plan view of a micro-mirror assembly that includes a temperature-compensated strain sensor such as that of FIG. 1.
Figure 7:
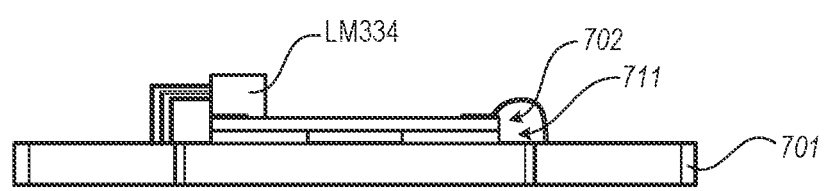
FIG. 7 illustrates a side view of the micro-mirror assembly of FIG. 6.

The temperature-compensated strain sensor described herein may be used to measure the displacement angle of a micro-mirror. FIG. 6 illustrates a plan view of a micro-mirror assembly 600. FIG. 7 illustrates a side view of the micro-mirror assembly of FIG. 6. As best seen in FIG. 56, the assembly 600 includes a micro-mirror 601 that is suspended on elongated members 602A and 602B (each element may also be referred to herein as a "tortional elongated axial structure").

In FIG. 7, supports 711 support a micro-mirror layer 712 on a substrate 701. There is space between the supports 711 and thus the micro-mirror has room to change angle in response to electrostatic force. The micro-mirror 601 tilts about the axis along which the torsional elongated members 602A and 602B twist. This tilting may occur by forces induced by signals applied proximate the micro-mirror 601. An off-the-shelf component (e.g., current source LM334) may be positioned at location LM334.

The temperature-compensated strain sensor described herein may be positioned at an end of one of the elongated members 602A or 602B, which can then measure strain at that position. In FIG. 6, the strain sensor is at position 603. The strain can then be measured to determine with relatively high precision and in real-time the angular position of the micro-mirror. This strain measurement can then be fed into a control circuit so that the control circuit can make appropriate adjustments in input signals to more accurately achieve the desired angle of the mirror 601.

Thus, the micro-mirror assembly 600 can be fine-tuned to allow for precision control of the angular position of the mirror 601. In some embodiments, the assembly 600 is incorporated into a wearable that is used to project an augmented or virtual reality experience. In that case, the experience may be made much more responsive with better video quality. As an example, there may be one micro-mirror assembly for vertical scanning of a laser across a surface that is within field of view, and one micro-mirror assembly for horizontal scanning of that laser across the surface.

Thus, the principles described herein provide an effective mechanism for reducing the temperature dependency of strain sensors, potentially allowing micro-mirror assemblies to be much better controlled across varying temperatures. The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A temperature-compensated strain sensor comprising:
a strain sensor comprising (i) first and second applied voltage terminals and (ii) first and second strain measurement terminals, wherein:
the strain sensor is configured such that when an applied voltage is applied across the first and second applied voltage terminals, the strain sensor generates a signal across the first and second strain measurement terminals,
the signal generated across the first and second strain measurement terminals has a first dependency that depends on a strain endured by the strain sensor and has a second dependency that depends on a temperature endured by the strain sensor, and
the temperature modifies a performance of the strain sensor and causes an offset to be imposed on the signal when no compensations are made; and
a temperature compensation circuit that applies the applied voltage across the first and second applied voltage terminals of the strain sensor, wherein:
the temperature compensation circuit compensates for the offset associated with the second dependency by applying a scaling factor to the applied voltage,
the scaling factor changes relative to changes in the temperature,
the scaling factor operates to at least partially cancel out the offset to the signal caused by the temperature, thereby compensating for the second dependency, and
as a result of at least partially cancelling out the offset, a change of the signal across a range of temperatures spanning at least 80 degrees Celsius is less than about 2%.

2. The temperature-compensated strain sensor in accordance with claim 1, the strain sensor comprising a plurality of piezoresistive elements.

3. The temperature-compensated strain sensor in accordance with claim 2, the plurality of piezoresistive elements being configured as a Wheatstone bridge having four nodes, two of the nodes being the first and second applied voltage terminals, and the other two of the nodes being the first and second strain measurement terminals.

4. The temperature-compensated strain sensor in accordance with claim 1, wherein the second dependency imposes a negative offset to the signal, and wherein application of the scaling factor imposes a positive offset to the signal.

5. The temperature-compensated strain sensor in accordance with claim 1, wherein the second dependency imposes a positive offset to the signal, and wherein application of the scaling factor imposes a negative offset to the signal.

6. The temperature-compensated strain sensor in accordance claim 1, wherein application of the scaling factor imposes a negative offset to the signal.

7. The temperature-compensated strain sensor in accordance claim 1, wherein the scaling factor declines linearly with the temperature.

8. The temperature-compensated strain sensor in accordance claim 1, wherein application of the scaling factor imposes a positive offset to the signal.

9. The temperature-compensated strain sensor in accordance claim 1, wherein the second dependency is reduced by a factor of at least 10 as a result of applying the scaling factor to the applied voltage.

10. The temperature-compensated strain sensor in accordance claim 1, wherein application of the scaling factor to the applied voltage provides a compensation for the second dependency of at least 90%.

11. The temperature-compensated strain sensor in accordance with claim 1, wherein application of the scaling factor to the applied voltage provides a compensation for the second dependency of at least 75%.

12. The temperature-compensated strain sensor in accordance claim 1, wherein application of the scaling factor to the applied voltage provides a compensation for the second dependency of at least 50%.

13. The temperature-compensated strain sensor in accordance claim 1, wherein application of the scaling factor to the applied voltage provides a compensation for the second dependency from about 90% to about 100%.

14. The temperature-compensated strain sensor in accordance with claim 1, wherein application of the scaling factor to the applied voltage provides a compensation for the second dependency from about 75% to about 100%.

15. The temperature-compensated strain sensor in accordance with claim 1, wherein a value of the signal is approximately proportional to a multiplicative product of the first dependency and the second dependency.

16. The temperature-compensated strain sensor in accordance claim 1, wherein application of the scaling factor operates to substantially fully cancel out the offset to the signal caused by the temperature.

17. The temperature-compensated strain sensor in accordance claim 1, wherein the scaling factor has a first value when the temperature is a first temperature value, and wherein the scaling factor has a second value when the temperature is a second temperature value.

18. The temperature-compensated strain sensor in accordance with claim 1, the temperature-compensated strain sensor being positioned with respect to a micro-mirror assembly such that displacement in a mirror of the micro-mirror assembly causes the strain endured by the strain sensor.

19. A micro-mirror assembly comprising:

a mirror situated on a tortional elongated axial structure that is elongated along a rotational axis of the mirror;

a strain sensor comprising (i) first and second applied voltage terminals and (ii) first and second strain measurement terminals, wherein:

the strain sensor is configured such that when an applied voltage is applied across the first and second applied voltage terminals, the strain sensor generates a signal across the first and second strain measurement terminals, the signal generated across the first and second strain measurement terminals has a first dependency that depends on a strain endured by the strain sensor and has a second dependency that depends on a temperature endured by the strain sensor, and the temperature causes an offset to the signal when no compensations are made; and a temperature compensation circuit that applies the applied voltage across the first and second applied voltage terminals of the strain sensor, wherein:

the temperature compensation circuit compensates for the offset associated with the second dependency by applying a scaling factor to the applied voltage, the scaling factor changes relative to changes in the temperature, the scaling factor operates to at least partially cancel out the offset to the signal caused by the temperature, thereby compensating for the second dependency, and as a result of at least partially cancelling out the offset, a change of the signal across a range of temperatures spanning at least 80 degrees Celsius is less than about 2%.

20. A micro-mirror assembly comprising:

a mirror situated on a tortional elongated axial structure that is elongated along a rotational axis of the mirror;

a temperature-compensated strain sensor situated with respect to the tortional elongated axial structure so as to experience strain in approximate proportion to a rotation of the mirror about the rotational axis, the strain sensor comprising (i) first and second applied voltage terminals and (ii) first and second strain measurement terminals, wherein:

the temperature-compensated strain sensor is configured such that when an applied voltage is applied across the first and second applied voltage terminals, the temperature-compensated strain sensor generates a signal across the first and second strain measurement terminals, the signal generated across the first and second strain measurement terminals has a first dependency that depends on a strain endured by the temperature-compensated strain sensor and has a second dependency that depends on a temperature endured by the temperature-compensated strain sensor, and the temperature causes an offset to the signal when no compensations are made; and a temperature compensation circuit that applies the applied voltage across the first and second applied voltage terminals of the strain sensor, wherein:

the temperature compensation circuit compensates for the offset associated with the second dependency by applying a scaling factor to the applied voltage, the scaling factor changes relative to changes in the temperature, the scaling factor operates to at least partially cancel out the offset to the signal caused by the temperature, thereby compensating for the second dependency, and as a result of at least partially cancelling out the offset, a change of the signal across a range of temperatures spanning at least 80 degrees Celsius is less than about 2%.

* * * * *